(12) United States Patent
Temple

(10) Patent No.: US 7,722,157 B2
(45) Date of Patent: May 25, 2010

(54) INK JET PRINTING METHOD AND PRINTER

(75) Inventor: Stephen Temple, Impington (GB)

(73) Assignee: Xaar Technology Limited, Cambridgeshire (GB)

( * ) Notice: Subject to any disclaimer, the term of this patent is extended or adjusted under 35 U.S.C. 154(b) by 0 days.

(21) Appl. No.: 10/520,013

(22) PCT Filed: Sep. 1, 2003

(86) PCT No.: PCT/GB03/03767

§ 371 (c)(1),
(2), (4) Date: Aug. 5, 2005

(87) PCT Pub. No.: WO2004/021268

PCT Pub. Date: Mar. 11, 2004

(65) Prior Publication Data
US 2005/0285897 A1    Dec. 29, 2005

(30) Foreign Application Priority Data
Aug. 30, 2002  (GB) .................................. 0220227.3

(51) Int. Cl.
B41J 2/13 (2006.01)
(52) U.S. Cl. .................. 347/41; 347/5; 347/15
(58) Field of Classification Search .................. 347/9, 347/19, 14, 23, 5, 15, 41; 358/1.8
See application file for complete search history.

(56) References Cited

U.S. PATENT DOCUMENTS

| 4,357,614 | A | 11/1982 | Tamai ........................ 346/75 |
| 4,379,304 | A | 4/1983 | Heinzl et al. ............ 346/140 R |
| 4,396,924 | A | 8/1983 | Rosenstock ............. 346/140 R |
| 4,611,219 | A | 9/1986 | Sugitani et al. ......... 346/140 R |
| 4,714,934 | A | 12/1987 | Rogers ................... 346/140 R |
| 4,901,093 | A | 2/1990 | Ruggiero et al. ........ 346/140 R |
| 4,905,017 | A | 2/1990 | Sugitani et al. ............... 346/1.1 |
| 5,258,774 | A | 11/1993 | Rogers ........................ 346/1.1 |
| 5,270,728 | A | 12/1993 | Lund et al. .................... 346/1.1 |
| 5,480,240 | A | 1/1996 | Bolash et al. .......... 400/124.01 |
| 6,106,093 | A * | 8/2000 | Nagoshi et al. ............... 347/15 |
| 6,354,694 | B1 | 3/2002 | Weber et al. ................... 347/48 |

(Continued)

FOREIGN PATENT DOCUMENTS

EP    277 703 A1    8/1988

(Continued)

OTHER PUBLICATIONS

International Search Report in PCT/GB03/03767 dated Dec. 10, 2003.

Primary Examiner—Lam S Nguyen
(74) Attorney, Agent, or Firm—Marshall, Gerstein & Borun LLP

(57) ABSTRACT

An ink jet or other printer serves to print for each row of input pixels, two superimposed rows of contiguous "super pixels," each print pixel being capable of receiving print contributions from N super pixels. The super pixels are twice the width of the input pixels and one row of super pixels is offset by half a super pixel width from the next row of super pixels. Redundancy is thus provided against the loss of a print element. The effects of smoothing or an image are reduced by edge enhancement processes.

5 Claims, 5 Drawing Sheets

U.S. PATENT DOCUMENTS

2002/0051144 A1 * 5/2002 Ilbery et al. .................. 358/1.8

FOREIGN PATENT DOCUMENTS

| EP | 278 590 A1 | 8/1988 |
|---|---|---|
| EP | 422 870 A2 | 4/1991 |
| EP | 422 870 A3 | 4/1991 |
| EP | 476 860 A2 | 3/1992 |
| EP | 476 860 A3 | 3/1992 |
| EP | 627 314 A2 | 12/1994 |
| EP | 627 314 A3 | 12/1994 |
| EP | 767 061 B1 | 4/1997 |
| EP | 881 082 A2 | 12/1998 |
| JP | 61-254350 | 11/1986 |
| JP | 2001-056407 | 2/2001 |
| RU | 2156697 | 9/2000 |
| WO | WO 91/17051 | 11/1991 |
| WO | WO 00/29217 | 5/2000 |
| WO | WO 02/02330 A1 * | 1/2002 |

* cited by examiner

INK JET PRINTING METHOD AND PRINTER

This is the U.S. national phase of International Application No. PCT/GB03/03767 filed Sep. 1, 2003, the entire disclosure of which is incorporated herein by reference.

BACKGROUND OF THE DISCLOSURE

1. Field of the Disclosure

The disclosure relates to printing and, in a particularly important example, to ink jet printheads.

2. Related Technology

There is a demand for digital printers having a printhead that extends across the full width of the printed page offering both high throughput and high print quality.

In an ink jet printer of this character, having the necessarily large number of closely spaced ink chambers and nozzles, there will always be a risk of failure of one or more nozzles, whether as a consequence of a manufacturing error or through nozzle blockage or other failures in use.

It will be possible to detect and discard manufactured printheads having even a single failed nozzle. However, because of the very large number of nozzles in each printhead, and because of the sophistication of the manufacturing techniques, such quality control measures would likely lead to an uneconomic manufacturing yield.

In use of the printhead, failure of even a single nozzle can lead to perceptible print artifacts, because of the spatial correlation of the artifact as the printed substrate is indexed past the printhead.

SUMMARY OF THE DISCLOSURE

Accordingly, the disclosure provides improved methods of printing and improved printheads that are able to conceal artifacts arising from nozzle failures or other departures from standard print performance across a print row.

Accordingly, the disclosure provides a method of printing parallel rows of contiguous pixels on a substrate indexed in a direction orthogonal to the rows, comprising the steps of printing for each row of pixels N superimposed rows of contiguous super pixels, each print pixel being capable of receiving print contributions from N super pixels, and each superpixel preferably being elongated in the row direction with an aspect ratio of N:1.

Advantageously, each of the N superimposed rows of contiguous super pixels is offset in the row direction with respect to each of the other superimposed rows, with the distance of said offset preferably being 1/N of the dimension of the super pixel in the row direction.

Preferably, print data are received in the form of an array of print data pixels and wherein the value of each super pixel is derived as a weighted sum of preferably at least three corresponding data pixels with each super pixel preferably symmetrically disposed with respect to print data pixels.

Advantageously, at least one of the weighting coefficients applied to the corresponding data pixels in said weighted sum is negative.

In a preferred form, the printability of each super-pixel 10 is measured, and the contribution to those pixels covered by that super-pixel is transferred wholly or in part to one or more other super-pixels from which those pixels are capable of receiving print contributions in accordance with any measured deviation in printability of that super pixel.

Suitably, an error in printability is measured for each super pixel and wherein the determination of the value of each super pixel includes a function of measured error in printability, with that function being preferably polynomial and including terms to at least the third power.

According to a further aspect, the disclosure provides an ink jet printer having a plurality of ink chambers each provided with a nozzle arrangement, the plurality of ink chambers being arranged so as to print on a substrate a row of contiguous print elements, the nozzle arrangement of each ink chamber being such that the print element associated with that ink chamber is elongated in the row direction with an aspect ratio of at least 2:1.

Advantageously, at least two sets of ink chambers are provided, each set being arranged so as to print a row of contiguous print elements, the rows of contiguous print elements printed by the respective sets of ink chambers being superimposed.

Suitably, the print elements of one set of ink chambers are offset in the row direction with respect to the print elements of another set of ink chambers with the offset being preferably the reciprocal of the aspect ratio.

In still a further aspect, the disclosure provides a method of printing a representation on a print medium of an array of print data pixels comprising the steps of distributing print data from said array of print data pixels over an array of super pixels in a distribution function such that each super pixel receives a print data contribution from at least two print data pixels and each print data pixel contributes print data to at least two super pixels; and forming print pixels on the medium such that each print pixel receives print contribution from at least two super pixels.

Preferably, the at least two super pixels from which a print pixel receives print contribution, receive print data contributions from different combinations of print data pixels.

Advantageously, each super pixel receives a print data contribution from at least three print data pixels with the print data contribution preferably varying in sign between said print data pixels.

Suitably, the method may further comprise the step of measuring the print efficiency of each super pixel, with said distribution function preferably including the measured print efficiency.

In a preferred form of the method, the step of forming print pixels on the medium such that each print pixel receives print contribution from at least two super pixels comprises the steps at each print pixel of depositing ink in an amount determined by one of the super pixels from which that print pixel receives print contribution and, while that deposited ink remains fluid, depositing ink in an amount determined by an other of the super pixels from which that print pixel receives print contribution.

In yet a further aspect, the disclosure provides a printer comprising an input port adapted to receive an array of print data pixels; a print arrangement for forming overlapping super pixels on a print medium and a print processor adapted to distribute print data from said array of print data pixels over the super pixels in a distribution function such that each super pixel receives a print data contribution from at least two print data pixels and each print data pixel contributes print data to at least two super pixels.

BRIEF DESCRIPTION OF THE DRAWINGS

The methods and printers will now be described by way of example with reference to accompanying drawings in which.

DETAILED DESCRIPTION

Figure 1:
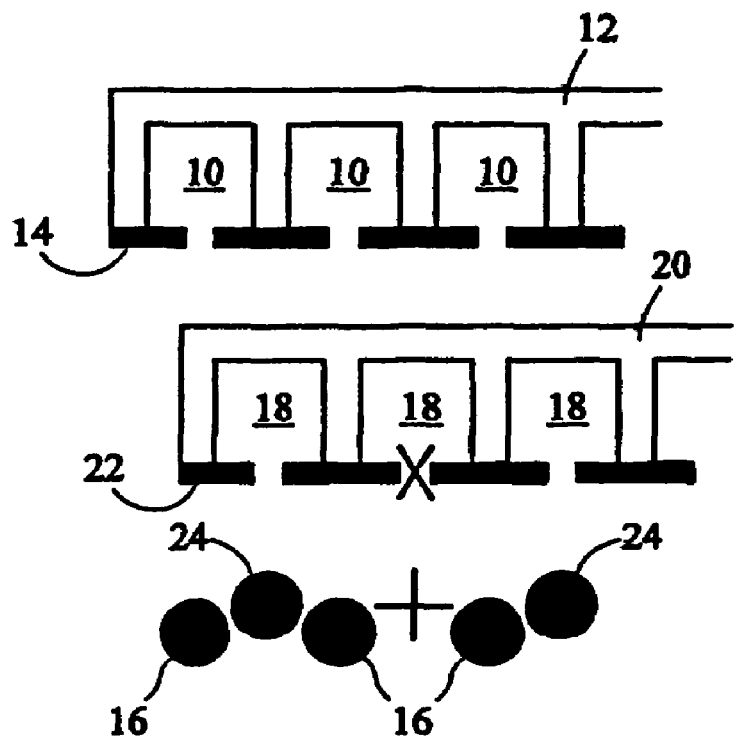
FIG. 1 is a schematic view of an ink jet printhead according to the prior art.

Referring initially to FIG. 1, an ink jet printhead has a first array of ink chambers 10 defined by a piezoelectric wall structure 12. A nozzle plate 14 secured to the wall structure 12 defines a nozzle for each ink chamber 10. This first array of ink chambers is shown as depositing ink droplets 16 on an appropriate substrate.

Ink jet printheads of this general form are described for example in EP-A-0 277 703 and EP-A-0 278 590.

To increase the number of ink droplets that can be deposited for a unit length of the print row, it has been previously proposed to provide a second array of ink chambers 18 similarly defined by a piezoelectric wall structure 20 and having a nozzle plate 22 defining one nozzle per ink chamber 18. This second array of ink chambers 18 is shown as depositing ink droplets 24 on the substrate. In this way, it is possible effectively to double the print resolution as compared with the "intrinsic" resolution defined by the nozzle spacing in a single array of ink chambers.

Each ink chamber 10 may be formed as an elongate channel, which is collinear with and shares the same ink supply ports, as an elongate channel forming a corresponding one of the ink chambers 18. The parallel array of ink channels is then angled to create the offset in the two sets of nozzles.

If one chamber or nozzle should fail (as marked schematically at X), there will be an unprintable pixel in the print row. Even though the number of ink drops per unit length of the print row may be high (perhaps 360 dpi), a single unprintable pixel may still produce a visually unacceptable artifact because of the spatial correlation of that artifact as the print substrate is indexed relative to the printhead.

Figure 2:
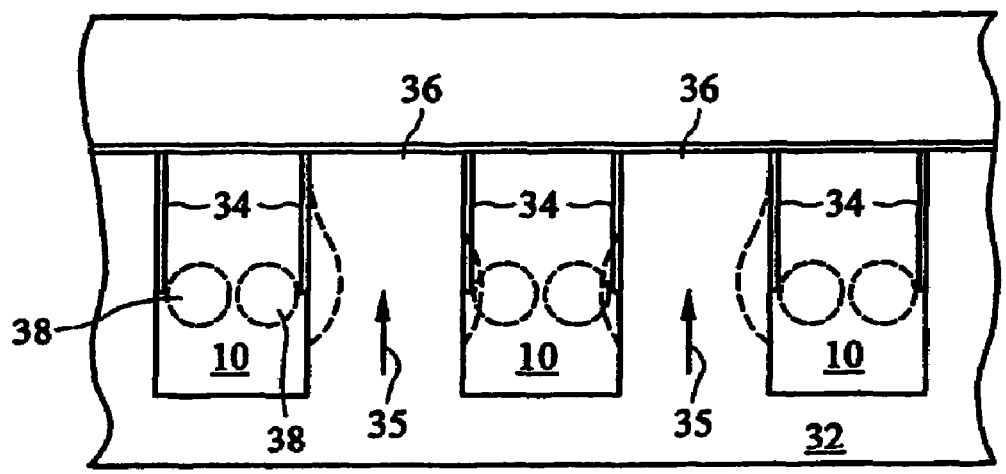
FIG. 2 is an end view of an ink jet printer according to one embodiment of the disclosure, with a nozzle plate removed for clarity.
Figure 3:
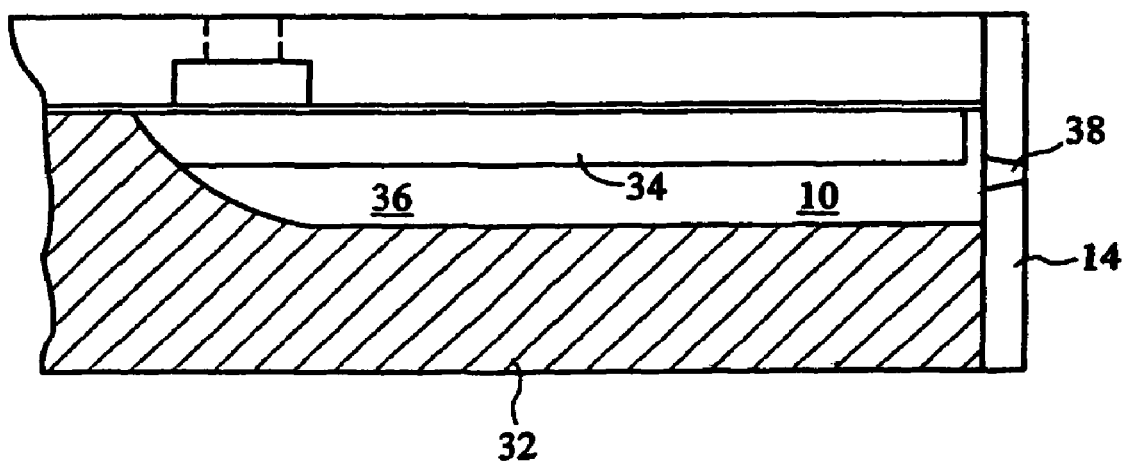
FIG. 3 is a sectional side view of an ink jet printer shown in FIG. 2.

Referring now to FIGS. 2 and 3, a set of print chambers 10 is defined by a piezoelectric wall structure 12. In this case, the nozzle plate 14 serves to define two nozzles per ink chamber 10. Each of the two nozzles is of the same or similar dimensions as the single nozzle in the FIG. 1 arrangement and the two nozzles of each chamber are arranged to form a single ink droplet 30 on the substrate of around double the volume of the ink drop 16 in the FIG. 1 arrangement. Each drop is elongated in the direction of the print row, having an aspect ratio of 2:1 and each drop has a length such that they are contiguous across the print row.

The chamber structure may be modified such that it provides narrower wall structures 12 and a wider print chamber 10 to allow space for the two nozzles. The walls may be as thin as 25 µm without significant loss of activity.

The print head of FIGS. 2 and 3 is of a structure commonly known as an "end shooter." As is known, for example from EP-A-0 277 703 incorporated herein by reference, channels 10 are formed in a block 32 of piezoelectric material polarized in the direction of arrow 35. The application of a electric field across electrodes 34 formed on opposite surfaces of a side wall 36 causes the piezoelectric material of the side wall to deflect in shear mode, thereby causing the ejection of an ink droplet from a nozzle associated with the channel. The position of the nozzles within the chamber is depicted schematically and may or may not be provided entirely within the channel. It is often possible for a portion of the nozzle to overlap the walls without a significant change in ejection characteristics.

The channel terminates with a nozzle plate 14, within which the nozzles are formed—as depicted in FIG. 3 which is a sectional view taken along the longitudinal axis of the channel.

Figure 4:
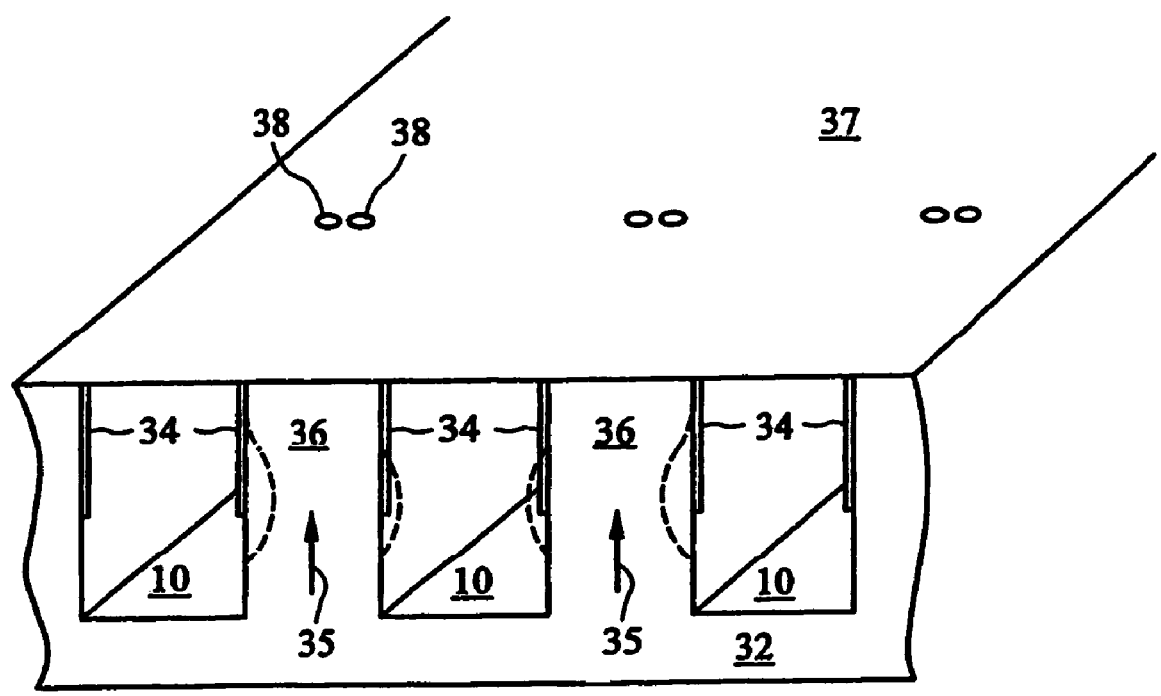
FIG. 4 is a perspective view of an ink jet printer according to another embodiment of the disclosure, with parts removed for clarity.

The print head of FIG. 4 is a structure commonly known as a "side shooter." Nozzles 38 are provided within a cover plate 37 and are located at a point which lies between the ends of the channels. There are two nozzles for each channel 10. Ink ports (not shown) are provided at either end of the channel to allow circulation of ink through the ejection chamber. A print head of this type, but with just a single nozzle is described in WO 91/17051. The nozzles are shown schematically and are not to scale.

Figure 5:
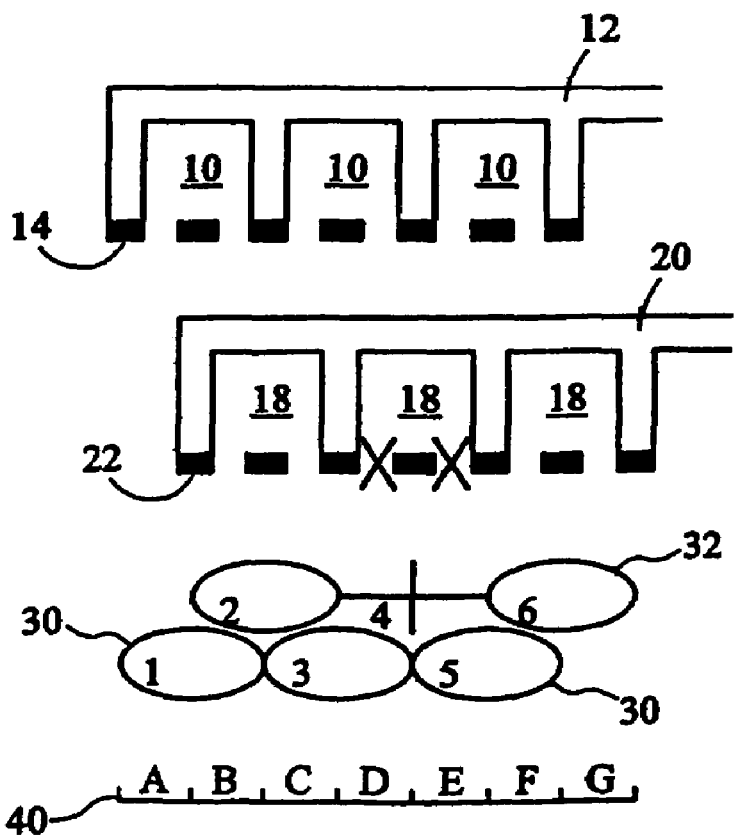
FIG. 5 is schematic view (similar in diagrammatic form to FIG. 1) of an ink jet printhead according to an embodiment of the disclosure.

As illustrated schematically in FIG. 5 (which is of the same diagrammatic form as FIG. 1 and which depicts the nozzle and channel arrangements of either the embodiment of FIGS. 2 and 3 or the embodiment of FIG. 4), a second set of ink chambers is provided and is again defined by a piezoelectric structure 20 with a nozzle plate or cover plate 22 defining two nozzles per ink chamber 18. These two nozzles combine to form ink drops 32 which similarly have a 2:1 aspect ratio and form a contiguous row.

The second set of ink chambers 18 may be located within a separate print head to that containing the first set of ink chambers 10 or may be part of the same print head such as described in WO 00/29217.

The ink drops 30 from the first array of ink chambers are offset along the print row with respect to the ink drops 32 of the second set of the chambers 18 by half the pitch of the ink chambers. With this arrangement, if there is a failure of a single chamber such as that shown schematically at X, no pixel remains unprintable.

It is convenient to regard the elongated ink drops 30 and 32 as printing "super-pixels," each pixel printed on the substrate receiving contributions from up to two super-pixels. The printed pixel structure is depicted in FIG. 5 as units A, B, C, D of line 40. In the control and drive arrangement for the printhead, provision is made to distribute the desired print density for a particular pixel between the two super-pixels which contribute to that pixel. In a typical arrangement, the desired print density for a pixel—established on a suitable greyscale—would be distributed 50% each to the two corresponding super-pixels. In the event that a failure of an ink chamber (or the associated nozzles) is detected, the distribution of print density can be switched so that each of the two pixels covered by the now missing super-pixel receive 100% of the desired print density from the other super-pixel which covers that pixel. This compensation for a missing super-pixel through variation in the greyscale of neighboring super-pixels will effect neighboring pixels. Such effects will generally be far less noticeable than an unprintable pixel. In an improvement, steps are taken to add noise (either by subtracting or adding grey levels) to distribute the effects of the missing lines over one or more neighboring superpixels and reduce the spatial coherence of the artifact.

Although the row of super-pixels 13 (being the odd-numbered super-pixels 1, 3, 5 . . . ) are shown in FIG. 5 to be transversely separated from the row of super-pixels 32 (being the even-numbered super-pixels 2, 4, 6 . . . ), this is for drawing convenience only. The two rows of super-pixels are effectively super-imposed.

One approach to deriving the greyscale levels for the super-pixels from the greyscale pixel values received as input print data is as follows.

The greyscale value of each super-pixel is set as one quarter of the sum of the greyscale values for the two pixels covered by the super-pixels, thus:

$$S_1=(P_A+P_B)/4 \quad S_2=(P_B+P_C)/4$$

This processing will serve as a low-pass spatial filter of the print image. In regions where this spatial filtering may have a noticeable effect on the image, as for example an edge, it will be possible to vary the algorithm or to pre-emphasize the edge so that the filtering has less noticeable effect In one embodiment of this disclosure, a print test is conducted to measure the print rate at each super-pixel for a nominal full black print density. This information is then employed in a calibration process which determines during future use of the printhead how the super-pixel greyscale values $S_1$, $S_2$, . . . are derived from the input pixel greyscale values $P_A$, $P_B$, . . . .

Thus in a case where the greyscale value of a pixel would be shared 50%-50% between two super-pixels, prior knowledge that one super-pixel is being printed less effectively than another may cause an alternative division to be made. In the case where one super-pixel is not being printed at all, a division 0%-100% can be made. If there is simply a reduction in the printed weight of a super-pixel by reason of some manufacturing variance, a distribution such as 50%; 75% may be suitable.

A further approach to derive greyscale levels for the super pixels from the greyscale values received as input print data while correcting for both errors within the print heads and enhancing the edges is as follows:

A full black reference image is printed and for each super pixel the optical density is measured. An average optical density is calculated and the error for each super pixel calculated using the equation:

$$E_p=1-(OD_p/OD_{average})$$

Where $E_p$ is the error; $OD_p$ is the measured optical density of super pixel p and $OD_{average}$ is the calculated average optical density across the row of super pixels.

A distributed error is calculated from the equation:

$$DE_p=2E_p{}^n-E_{p+1}{}^n-E_{p-1}{}^n$$

where n is a value greater than 1 and chosen such that only gross errors are distributed through this term. A value of 4 is appropriate.

The image data is input as a value between 0 (no image data) and 1, full black for each print data pixel. The grey level for each print data pixel is denoted by the term g.

Figure 6:
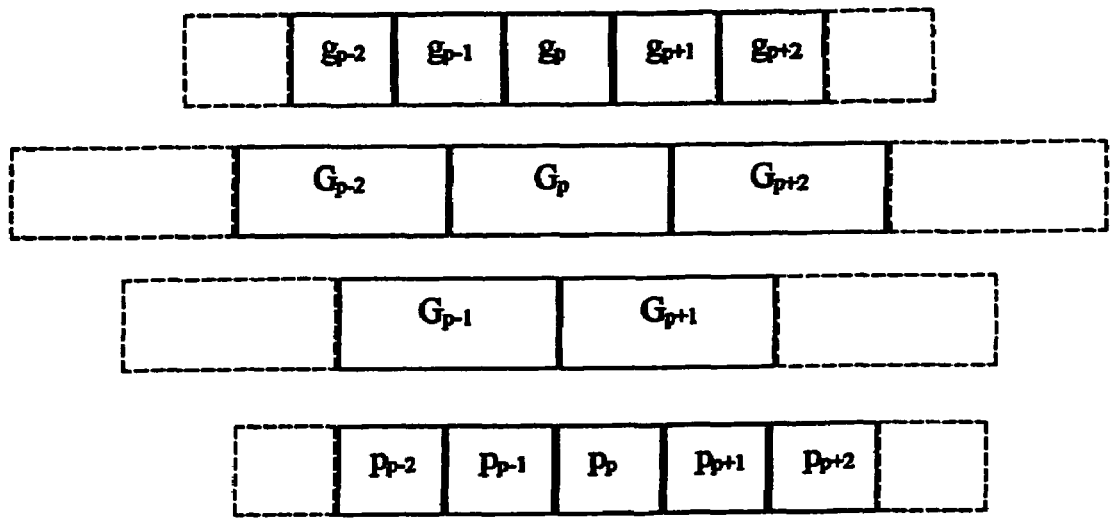
FIGS. 6 and 7 are diagrams illustrating the alignment of input data pixels, super pixels and pixels printed on a substrate.

Super pixels are defined as shown diagrammatically in FIG. 6. It will be seen that each print data pixel (represented as the input grey level $g_p$) has symmetrically aligned with it a super pixel (represented as a calculated base grey level $G_p$). Each pixel has an aspect ratio of 2:1, extending in the row direction a distance twice the dimension of the print data pixel. The super pixels are arranged in two rows with the super pixels aligned with even print data pixels in one row and the super pixels aligned with odd print data pixels in another.

Figure 7:
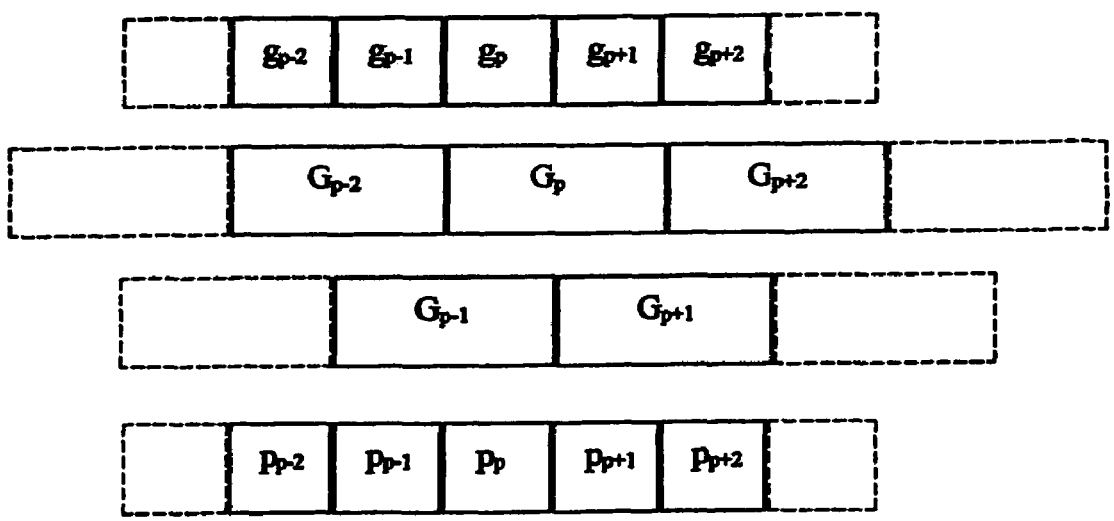

An alternative arrangement can be identified (as shown in FIG. 7) in which the array of super pixels is not symmetrically aligned with respect to the array of input data pixels.

The base level G for each super pixel is then calculated from the equation:

$$G_p=(g_p+(g_{p+1}+g_{p-1})/2)/2$$

It has been mentioned above that an effect of distributing the input print data values over super pixels may be to soften the printed representation in the row direction. If appropriate, edges in the print data may be "pre-enhanced" so as to reduce the perceived effect of this softening. In the present example, this enhancement is conveniently effected by defining:

$$\text{Edge}_p=EHF*(2g_p-g_{p+1}-g_{p-1})$$

EHF is an arbitrary value selected on the edge enhancement required; a typical value being around 0.5.

The error in the grey value is at each super pixel (arising from the measured error and the distribution of that error over neighboring super pixels) is then calculated from the equation:

$$G^{Error}{}_p=G_p*(E_p-DE_p*EECF)$$

where EECF is an arbitrary edge error correction factor; a typical value being around 0.5.

The print data for each super pixel are subsequently calculated from the equation:

$$\text{Print}=G_p/2+G^{Error}{}_p/2+\text{Edge}_p$$

The calculated print data are sent to the ejection channels to print the required image.

As illustrated schematically in FIG. 6, the p'th printed pixel P on the substrate receives print contribution from two super pixels. In the arrangement where the two rows of pixels are printed in a single pass using two rows of ejection chambers, the ink from the two super pixels combines to produce an optical density determined by the sum of the print values for those super pixels.

Figure 8:
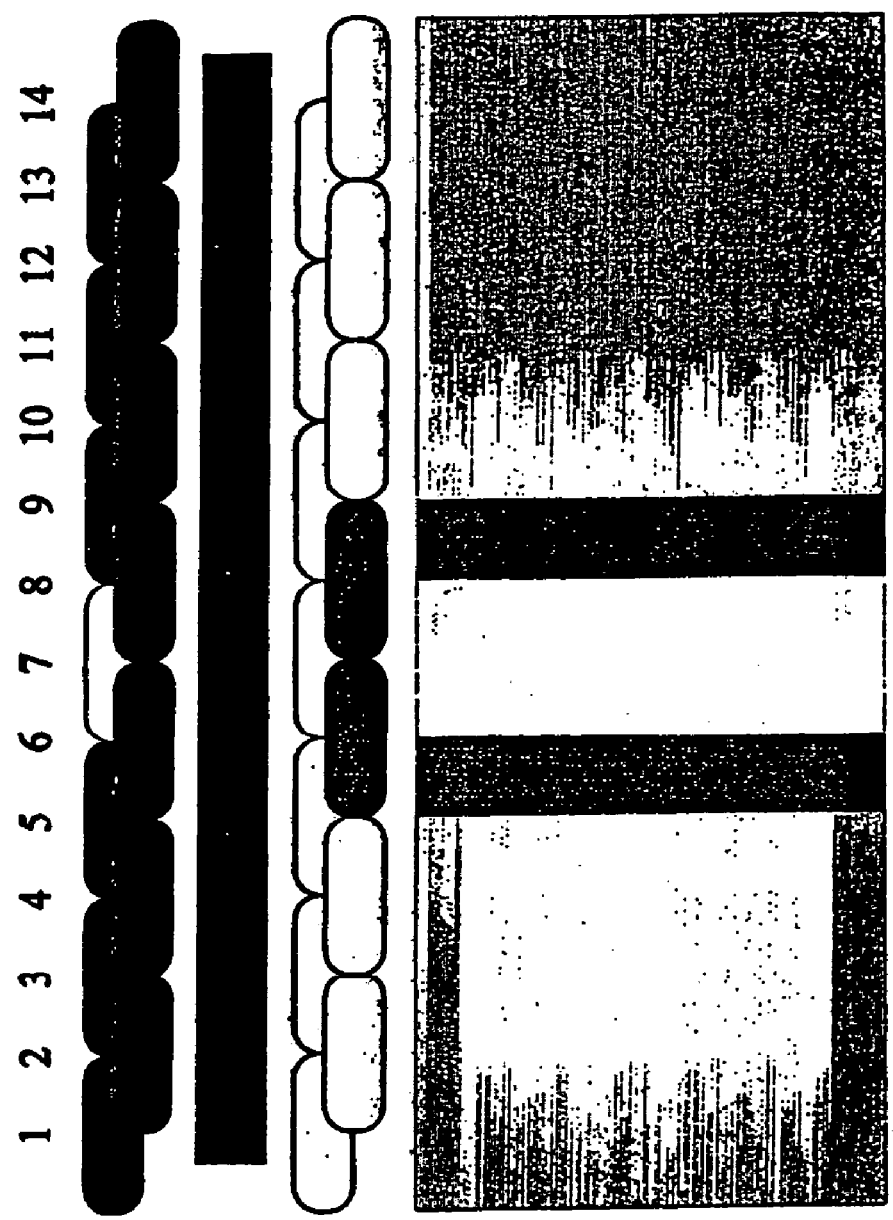
FIG. 8 is a diagram illustrating the performance of an ink jet printer according to an embodiment of the disclosure.
Figure 8:
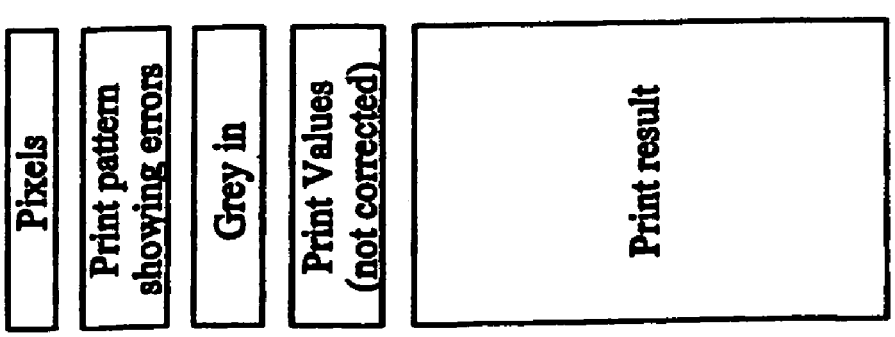

This described arrangement has a number of advantageous features. If a particular ejection chamber is inoperable (so that the measured error $E_p=1$), the effect of the error distribution is to increase correspondingly the grey level of those super pixels in the other row that overlap with the "failed" super pixel. There is therefore avoided the highly visible artifact of a straight line of unprintable pixels. This is illustrated diagrammatically in FIG. 8.

The softening that would otherwise accompany such redundancy in the print capability is reduced by an edge enhancement process, ingeniously implemented by adding negative terms to the weighted sum of input data pixels from which the print values for the super pixels are calculated.

Less gross errors detected by the measurement process are of course also compensated. The use of both linear and polynomial terms to provide for this compensation of measured super pixel "printability" is of course only one of a number of alternative approaches. A gross error (typically arising from a failing ejection chamber) might be detected by thresholding the measured error and substituting an alternative error distribution function, if that threshold is exceeded.

The calculations described above represent only one example of a technique for distributing input print values over super pixels. In certain applications, the step of measuring the printability of super pixels may be omitted. In other applications, nonalgebraic techniques may be employed. Also, the distribution may be caused to vary with the input print data, if thought appropriate.

In other alternative arrangements, a number of super-pixels greater than two may contribute to each pixel. Thus, an arrangement having three arrays of print chambers, with each super-pixel covering three pixels and with each pixel receiving print contributions from three super-pixels, can also be employed. This arrangement would be expected to increase the resilience to super-pixel failures at the price of increased spatial filtering. In this case, with N=3 (rather than N=2, as in the previously described embodiments), the offset between rows of super pixels can be 1/N of the dimension of the super pixel in that direction. In other arrangements, there may be no offset between superimposed rows of sub pixels.

Experiments have shown that with piezoelectric operated ink jet print heads, it is possible to double the number of nozzles in an ink channel with only a modest increase in the actuation voltage required. If necessary, the nozzles formed in the applied nozzle plate may overhang the piezoelectric wall structure to a certain degree without dramatically impairing the operation. The skilled man will recognize that there are many alternative techniques for printing an elongate super-pixel having an aspect ratio of 2:1, 3:1 or greater. In certain applications of the present invention, super pixels may have an aspect ratio of 1:1.

In the description of preferred embodiments, the example has been taken of an ink jet printer with N rows of ejection chambers extending (or scanned) across the print medium, with the medium indexed in a direction orthogonal to the row direction after each pass. In an alternative, the super pixels from one pass are superimposed with super pixels from another pass. Care should be taken that N super pixels contribute to each print pixel; this can be achieved—for example by ensuring that all N super pixels are printed while the ink remains wet or (in the case of curable inks) un-cured.

Concepts here described will find application in other print arrangements. In particular, the method of printing a representation on a print medium of an array of print data pixels comprising the steps of distributing print data from said array of print data pixels over an array of super pixels in a distribution function such that each super pixel receives a print data contribution from at least two print data pixels and each print data pixel contributes print data to at least two super pixels; and forming print pixels on the medium such that each print pixel receives print contribution from at least two super pixels, will find useful application in arrangements other than ink jet printing and in arrangements other than a one dimensional printhead indexed across a print medium.

The invention claimed is:

1. A method of printing a representation on a print medium of an array of contiguous print data pixels comprising a plurality of parallel rows of contiguous print data pixels, the method comprising the steps of:

processing print data from said array of contiguous print data pixels such that it is distributed over an array of super pixels, each super pixel having a print level, according to a distribution function such that the print level of each super pixel is calculated based on a print data contribution from at least two print data pixels and each print data pixel contributes print data to the calculation of print levels for at least two super pixels;

and forming print pixels on the medium such that each print pixel receives a print contribution from N (where N is an integer greater than 1) super pixels, wherein said processing step comprises distributing the print data for each of said rows of print data pixels over a respective group of N superimposed rows of contiguous super pixels, and wherein each of said superimposed rows of super pixels extends in a row direction and each row within a group of N rows of super pixels is offset in said row direction with respect to each of the other superimposed rows in that group.

2. A method according to claim 1, wherein the distance of said offset is 1/N of the length of each super pixel in the row direction.

3. A method according to claim 1, wherein the distance of said offset is 1/N of the length of each super pixel in the row direction.

4. A printer comprising an input port adapted to receive an array of print data pixels, said array comprising a plurality of parallel rows of contiguous print data pixels; a print arrangement for forming overlapping super pixels on a print medium and a print processor adapted to process print data from said array of print data pixels such that it is distributed over the super pixels according to a distribution function such that the print level of each super pixel is calculated based on a print data contribution from at least two print data pixels and each print data pixel contributes print data to the calculation of print levels for at least two super pixels;

wherein each print pixel receives a print contribution from N (where N is an integer greater than 1) super pixels, wherein said print processor is further adapted to distribute the print data for each of said rows of print data pixels over a respective group of N superimposed rows of contiguous super pixels, said print arrangement being adapted to form said groups of N superimposed rows of contiguous super pixels, and wherein each of said superimposed rows of super pixels extends in a row direction mad each row within a group of N rows of super pixels is offset in said row direction with respect to each of the other superimposed rows in that group.

5. A printer according to claim 4, adapted to form N super pixels for each print pixel.

* * * * *